United States Patent
Billmaier et al.

(10) Patent No.: US 9,219,900 B2
(45) Date of Patent: Dec. 22, 2015

(54) DETERMINE VIDEO TO PLAY WITH AUDIO

(75) Inventors: David Paul Billmaier, Woodinville, WA (US); Jason Christopher Hall, Seattle, WA (US); Alexander Charles Barclay, Seattle, WA (US); John Max Kellum, Seattle, WA (US); Henry Hideyuki Yamamoto, Issaquah, WA (US)

(73) Assignee: HEWLETT PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/348,982

(22) PCT Filed: Oct. 27, 2011

(86) PCT No.: PCT/US2011/058136
§ 371 (c)(1),
(2), (4) Date: Apr. 1, 2014

(87) PCT Pub. No.: WO2013/062556
PCT Pub. Date: May 2, 2013

(65) Prior Publication Data
US 2014/0233905 A1 Aug. 21, 2014

(51) Int. Cl.
*H04N 5/85* (2006.01)
*H04N 9/82* (2006.01)
*H04N 21/472* (2011.01)
*H04N 21/43* (2011.01)
*H04N 21/81* (2011.01)

(52) U.S. Cl.
CPC ......... *H04N 9/8211* (2013.01); *H04N 21/4307* (2013.01); *H04N 21/472* (2013.01); *H04N 21/8106* (2013.01)

(58) Field of Classification Search
None
See application file for complete search history.

(56) References Cited

U.S. PATENT DOCUMENTS

| | | | |
|---|---|---|---|
| 2003/0126605 A1 | 7/2003 | Betz et al. | |
| 2003/0140083 A1* | 7/2003 | Watkins | 709/102 |
| 2004/0025180 A1* | 2/2004 | Begeja et al. | 725/46 |
| 2004/0170392 A1 | 9/2004 | Lu et al. | |
| 2007/0206606 A1* | 9/2007 | Coleman et al. | 370/395.52 |
| 2008/0046936 A1* | 2/2008 | Dam et al. | 725/88 |
| 2009/0177299 A1 | 7/2009 | Van De Sluis et al. | |
| 2011/0022620 A1 | 1/2011 | Woods | |
| 2011/0167061 A1* | 7/2011 | Li et al. | 707/728 |

FOREIGN PATENT DOCUMENTS

| | | |
|---|---|---|
| CN | 101577811 | 11/2009 |
| JP | 2007316250 | 12/2007 |

OTHER PUBLICATIONS

International Searching Authority, Appl. No. PCT/US2011/058136, filed Oct. 27, 2011, Search Report and Written Opinion, 8pp, dated Jun. 1, 2012.

(Continued)

*Primary Examiner* — William C Vaughn, Jr.
*Assistant Examiner* — Eileen Adams
(74) *Attorney, Agent, or Firm* — Trop, Pruner & Hu, P.C.

(57) ABSTRACT

Example embodiments disclosed herein relate to determining video to play based on audio. Videos associated with the audio are determined. One of the videos to play with the audio is determined based on analysis.

11 Claims, 5 Drawing Sheets

(56) References Cited

OTHER PUBLICATIONS

Last.FM Ltd; Frequently Asked Questions; < http://www.last.fm/help/faq?category=Artist+Pages >; Updated Feb. 11, 2009.

The International Bureau of WIPO, International Preliminary Report on Patentability for PCT/US2011/058136 dated May 8, 2014 (5 pages).

* cited by examiner

DETERMINE VIDEO TO PLAY WITH AUDIO

CROSS-REFERENCE TO RELATED APPLICATION

This application is a national stage application under 35 U.S.C. §371 of PCT/US2011/058136, filed Oct. 27, 2011.

BACKGROUND

Service providers are challenged to deliver quality and value to consumers, for example by providing audio services. Music and other audible content are presented on various devices today such as media players, phones, and other computing devices. These devices may play audible content stored on the device or stored at another location, for example, via streaming.

BRIEF DESCRIPTION OF THE DRAWINGS

The following detailed description references the drawings, wherein.

DETAILED DESCRIPTION

Figure 1:
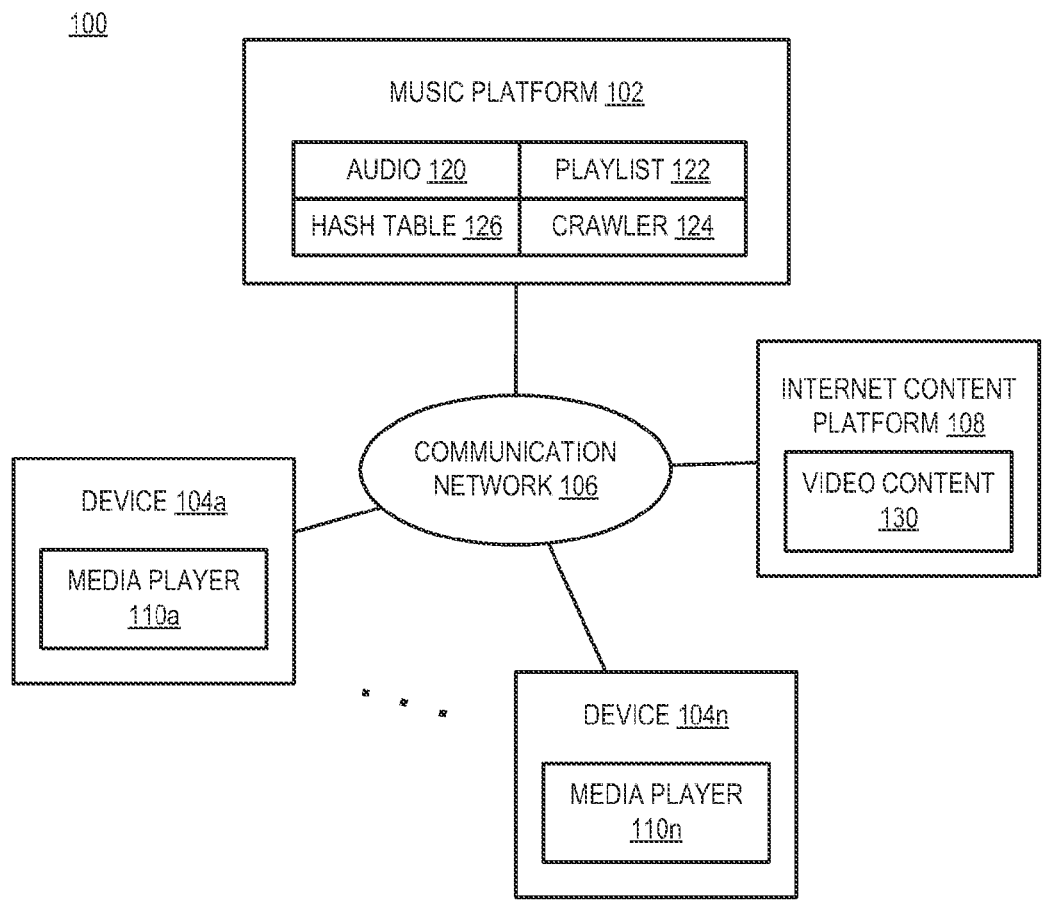
FIG. 1 is a block diagram of a system capable of determining video media to play along with audio playback, according to one example.

Users of devices today continually consume media. For example, users utilize their mobile phones, tablets, computers, set top boxes, etc. to listen to audio and/or to view visual content. In certain examples, users may stream audio and/or visual content onto their devices or play the audio and/or visual content from downloaded files. Some websites, such as YouTube™ and HULU cater to streaming video, which may be associated with a concurrent audio stream.

Some users, however, may choose to listen to audio files on a user's device or streaming onto the device. These files may be associated with a playlist. In certain embodiments, a playlist is a list of content. Further, an audio playlist can be a list of audio content. The audio content can be, for example, audio files, streaming audio from a source such as a cloud, or the like. Further, in one example, the playlist can be made and/or customized by a user. In another example, the playlist can be associated with a radio station such as an Internet radio station. Moreover, the audio content can be streamed over the Internet or played off of a file stored on a memory of the user's device.

While listening to such audio content, a user may wish to be visually entertained. Standard players may display album art, audio information (e.g., title, artist, etc.), or the like while playing audio. However, the user may desire something more visually compelling and related to the music to be displayed during playback of the audio content.

Accordingly, various embodiments disclosed herein relate to correlating video files, such as streaming video media, with the audio content. The audio content can be played on the user's device while the associated video content is also played on the device. The correlating video files can also be customized for the user. This customization can be based on feedback of playing video media by the user and/or other users. Feedback from other users can include feedback of what videos are most popular. Further, the feedback can be used to determine whether tags or other information associated with the videos are reliable. Moreover, feedback from the user can include whether the user likes a particular video that has been selected to play with audio the user is listening to. When the feedback is received, attributes associated with the video can be reviewed and used for future scoring of videos. Scores determined for videos can be used to determine a video file to associate with particular audio content.

With these approaches, a user may be able to listen to an audio track of a playlist and simultaneously view an associated music video and/or other content that can be associated with the audio track. As noted, the selection of the video can be customized for the user. As such, user feedback can be used to train the system to provide video that the user wishes to see. Further, different playlists can be associated with different customizations. For example, playlists associated with music may be geared more towards music videos and/or live shows while playlists associated with podcasts can be associated with related media such as sports, gardening, etc.

FIG. 1 is a block diagram of a system capable of determining video media to play along with audio playback, according to one example. The system 100 can include a music platform 102 that can communicate with devices 104a-104n via a communication network 106. The devices 104 and/or music platform 102 can further communicate with an internet content platform 108 via the communication network 106. In certain examples, the music platform 102, the devices 104a-104n, and/or the internet content platform 108 are computing devices, such as servers, client computers, desktop computers, mobile computers, cellular phones, computing clouds, etc. The music platform 102, the devices 104, and/or the internet content platform 108 can be implemented via a processing element, memory, and/or other components.

The music platform 102 can provide access to music content or other audible content to devices 104 of users. The users can use respective media players 110a-110n on respective devices 104a-104n to present the audible content, for example, via a speaker or earphone. The audible content can be encoded via a digital rights management (DRM) scheme. In certain examples, the music platform 102 can include audio 120 that can be downloaded to or streamed to the devices 104. As such, the music platform 102 can provide an interface, such as a web interface or an Application Programming Interface (API) to the device 104 to provide the audio 120. The device 104 can execute an application, such as a media player 110 to download and play and/or stream the audio 120.

In certain scenarios, the audio 120 can be played based on a playlist 122. In one example, the playlist 122 is located on the music platform 102. In another example, the playlist 122 can be stored at the device 104. In certain embodiments, a playlist is a list of audio content. As such, the playlist 122 may point to the audio 120 on the music platform 102 and/or stored on the device 104. Multiple playlists 122 can be stored and shared by the music platform 102. Further, playlists 122 can be created and stored for individual users. Moreover, playlists 122 can include lists of audio 120 represented as radio stations. As such, a disk jockey can generate a playlist 122 or multiple playlists 122 for the radio station and the user can use that playlist 122 on the user's device 104. Further, the playlist 122 can be generated based on criteria, such as one or multiple artists, genres, songs, etc. Similarities between audio content can be used in the selection of the playlist 122.

A user can use the media player 110 to play a playlist 122 on the user's device 104. In certain scenarios, the device can include a display. The display can allow for the device to present video content to the user. The music platform 102 can have knowledge of one or more songs or other audio content in the queue for the user. The knowledge can be because the playlist 122 is on the music platform 102, if the device 104 transmits the information to the music platform 102, or the like.

The music platform 102 can search for video content associated with the audio content in the queue. As such, the music platform 102 can use a web crawler 124 to search internet content platforms 108 for video content 130 that may be associated with the audio content. In certain examples, a web crawler 124 is a set of instructions that cause a computing device to browse the World Wide Web in a methodical, automated approach. The web crawler 124 can search known media sites, such as YouTube™, HULU, etc. for video content 130 such as streaming video or other video files. Further, the media sites can be parts of one or more internet content platforms 108.

In certain examples, the search can be used to generate a database of information. The information can include attributes associated with the video content 130. The attributes can be associated with the web pages the video content 130 was found on. In certain examples, an attribute is information describing the video content 130. As such, an attribute may include an artist name, genre associated with the video content 130, identifiers such as names, tags, uploader information, reviews, other words on an associated web page, etc. When the playlist 122 is being played, the next audio content and/or multiple audio content on the playlist 122 can be associated with video content. In one example, the association can be based on a comparison of descriptive information of the audio 120, such as an artist name, a genre, a track title, an album name, tags, etc. with the attributes. In another example, the association can be based on an analysis of audio associated with the video contents. For example, a hash table 126 can be generated to determine associations of audible information between the audio 120 on the playlist 122 and audible content associated with the video content 130. As such, in certain scenarios, the video content 130 can be associated if the audible content associated with the video content 130 includes at least a portion of the audio 120. Further, multiple video files or other video content 130 can be found during the search that matches with the audio 120. As such, an analysis can be used to determine which video file to play with the audio 120 on the user's device 104.

In certain examples, an analysis of the linguistic content can be used to score how good and/or how related the video content 130 is to the audio 120. More closely related video content 130 can score better. Further, the scoring can be based, at least in part, on user feedback.

When searching, the web pages associated with the video content 130 can be processed for information such as linguistic content. In certain embodiments, linguistic content includes words that can be processed for useful information. The words can be processed using a linguistic analysis. In certain examples, a linguistic analysis is a study of human language. The analysis can use language structure to decipher meaning from the words and syntax. For example, a sentence on a web page associated with particular video content 130 saying "this music video is a fake" can be associated with a negative score or a diminishing score. Further, video content 130 may be screened for appropriateness for the user based on user preferences, user demographics, the number of views of the video content, feedback by the user, feedback by other users, or the like.

Other information, such as the attributes can also be used in scoring. A description of the audio 120 can be compared with attributes during the scoring. Matches between the description and the attributes can be used to determine a better score. Additionally, multiple views of the video content 130 can help the score and reflect on the worthiness of the video content 130 to be played. Moreover, good feedback to the video content 130 can improve scores.

In certain examples, an analysis of the linguistic content can be used to adjust how attributes are treated. For example, when video content 130 is chosen to be presented to a user and is presented to a user during audio playback, the user can determine a rating for the video, for example, bad, good, medium, a numerical value, etc.

If the associated video is negatively rated, in the future, ratings associated with one or more of the attributes and/or linguistic content can be scored differently and/or weighted differently. For example, if a particular user is the uploader of the video content chosen and the video content is rated negatively, future video content associated with the uploader can be scored poorly. Further, if the uploader is negatively reviewed multiple times, the uploader's videos may be filtered and/or an attribute associated with the uploader may be associated with a negative score that may be amplified. Similarly, good reviews can be used to associate the uploader with better scores. The example of an uploader is used in this scenario, however, other types of attributes can be used for such scoring.

Once each of the video media that may be related to the audio 120 is scored, the music platform 102 can select one of the video media for playback with the audio 120. The selection can be based on which of the video media has the best score. The best score may, for example, be the greatest score, the lowest score, the closest score to a range, or the like.

The access to the video media can then be facilitated by the music platform 102. In one example, the music platform 102 may buffer the video media from the internet content platform 108 and provide the video media to the device 104. In another example, the music platform 102 can provide a link to the video media to the device 104. The media player 110 on the device 104 can then retrieve (e.g., via a download or streaming data) the content from the Internet content platform 108. The media player 110 can thus playback the audio 120 with the video media. In certain examples, the video media is muted during playback so that the video media provides visual information displayed on the device 104 and the audio 120 provides audible information presented by the device 104.

During playback, the user can provide feedback about the audio, the video media, or a combination thereof. In certain examples, feedback to the video can be used to change scoring of the video playing and/or the scoring of future visual media. In other examples, a separate scoring and analysis system can be associated with feedback that may be directed towards the audio. For example, if the user is using a custom playlist, the user may already like the audio content and feedback can be associated with how the user likes the video that is played with the audio. Separate feedback inputs may be provided to the user for the audio, the video, the combination, etc. Further, when a video is targeted with negative playback, another video can be provided (e.g., the next best scoring video). Moreover, the audio 120 can continue to be played back during the change in video media. Additionally, the new video media played can be synchronized to start near the location in playback that the audio 120 is at. Such an action may be customized based on a user preference.

Moreover, analysis for the next track on the playlist 122 can be performed while playback of the current audio track occurs. Further, in certain examples, the music platform 102 may compile lists of possible video media that may be associated with each of the audio tracks known to the music platform 102. Scoring can be performed during playback of the playlist, when the playlist is created, or the like. Further, the rescoring can be performed based on new feedback by the user.

The communication network 106 can use wired communications, wireless communications, or combinations thereof. Further, the communication network 106 can include multiple sub communication networks such as data networks, wireless networks, telephony networks, etc. Such networks can include, for example, a public data network such as the Internet, local area networks (LANs), wide area networks (WANs), metropolitan area networks (MANS), cable networks, fiber optic networks, combinations thereof, or the like. In certain examples, wireless networks may include cellular networks, satellite communications, wireless LANs, etc. Further, the communication network 106 can be in the form of a direct network link between devices. Various communications structures and infrastructure can be utilized to implement the communication network(s).

By way of example, the music platform 102, the devices 104, and the internet content platform 108 communicate with each other and other components with access to the communication network 106 via a communication protocol or multiple protocols. A protocol can be a set of rules that defines how nodes of the communication network 106 interact with other nodes. Further, communications between network nodes can be implemented by exchanging discrete packets of data or sending messages. Packets can include header information associated with a protocol (e.g., information on the location of the network node(s) to contact) as well as payload information. A program or application executing on the devices 104, the music platform 102, or the internet content platform 108 can utilize one or more layers of communication to utilize the messages.

Figure 2B:
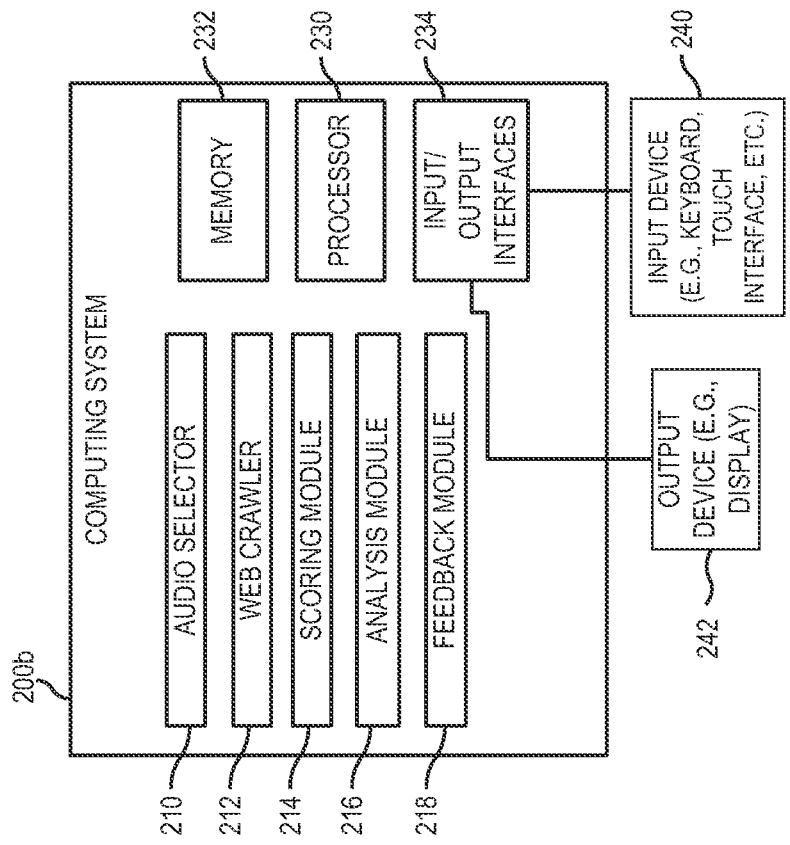
FIGS. 2A and 2B are block diagrams of computing systems capable of determining a streaming video to play with selected audio, according to various examples.
Figure 2A:
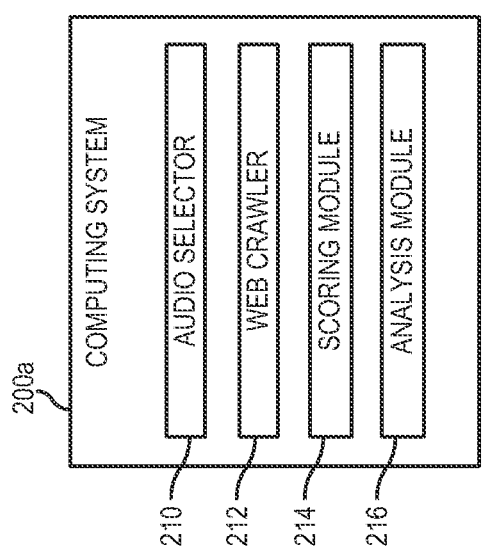

FIGS. 2A and 2B are block diagrams of computing systems capable of determining a streaming video to play with selected audio, according to various examples. Computing systems 200a, 200b include components that can be utilized to determine video media that can be played to a user with selected audio. The respective computing systems 200a, 200b may be a desktop computer, a server, a workstation, or any other computing device. Further, the computing systems 200 can be implemented as a combination of computing devices or as a cloud. The computing system 200a can include an audio selector 210, a web crawler 212, a scoring module 214, and an analysis module 216. Further, the computing system 200b may further include a feedback module 218, a processor 230, memory 232, input/output interfaces 234, or the like.

A user can use a device to playback audio. The audio can be associated with a music platform that can be implemented using a computing system 200. The computing system can store information as to what audio is playing on the device, what audio is going to be played on the device, or the like. In the case of a local playlist stored at the device, the device can transmit the information to the computing system 200. In certain scenarios, the computing system 200 and the device can synchronize using a user account. As such, the computing system 200 can have user profiles, user histories, user feedback, and the like in a database.

Audio selector 210 can select audio associated with the user or the user's device. The selected audio can be used for playback to the user. In certain scenarios, the selection can occur by receiving information from the user's device (e.g., playlist information). In other scenarios, the playlist or a radio station associated with the audio can be selected at the computing device 200. In these scenarios, the selected audio can be based on a queue of audio tracks to be presented to the user via the user's device. The audio tracks can be streamed to the user's device, can be previously downloaded to the user's device, can be downloaded before playback, or the like. In some scenarios, audio tracks can be associated with unique identifiers (e.g., a serial number) or other identifiers such as artist, album, album track number, publishing date, etc. that can be used to identify the audio track. When the selected audio is being played back to the user, the user may wish to view an associated video. The video can be downloaded and/or streaming.

The computing system 200 can use the web crawler 212 to search for video media on the Internet, for example, via the World Wide Web. In one example, the web crawler 212 can search through streaming media sites to catalog available streaming video. Certain embodiments described herein may be focused on streaming video; however, it is contemplated that other types of visual content and video transfer capabilities can be used. As noted above, the web crawler 212 can browse the World Wide Web in a methodical manner. Further, the web crawler 212 can generate a database that is stored in memory 232. The database can include a link to the streaming media or other video content. Moreover, the database can include a list of attributes, in this scenario, an attribute can be information describing the streaming video. Information on a web page associated with the streaming video can be used as attributes or to determine attributes. As such, an attribute may include an artist name, genre associated with the streaming video, identifiers such as names, tags, uploader information, reviews, user ratings, other user feedback, artist influences, other words on an associated web page, combinations of words, etc.

In certain examples, combinations of words can be analyzed using a linguistic analysis to make up an attribute. For example, a review section of a streaming video web page may include comments such as "Awesome Video," "Horrible Band," or "Horrible Lighting." These combinations can be considered attributes. In certain scenarios, certain keywords, such as modifiers (e.g., awesome, horrible, good, great, bad, etc.) can be used to determine the attribute. For example, when the word "good" is found, an analysis of the linguistics may be used to determine what is "good." This can be used in scoring and determining which streaming video to present to the user.

The database of locations of streaming videos and associated attributes can be updated via the web crawler 212. Further, the database can be split into smaller databases. In one example, the database may include a collection of databases each associated with particular audio content. In another example, one database can include pointers from each audio track to possibly associated streaming videos. Further, another database may include the attributes associated with each streaming video. Various ways can be used to implement the database(s). Moreover, the updating of the attributes and/or locations of streaming video can be performed by the web crawler 212 in a methodical manner. In certain scenarios, associations between streaming videos and audio content can occur based on analysis and comparisons between the attributes and information describing the audio tracks. As such, the web crawler 212 can be used to search for multiple options of streaming video associated with audio, including the selected audio.

Once audio is selected, the scoring module 214 can be used to score each of the associated streaming videos. This can be done to determine how appropriate the streaming video is for the user. As such, the scoring module 214 can perform a statistical analysis on the attributes to score each of the streaming videos based, at least in part, on feedback of the user.

Various ways can be used to score the streaming videos. In one example, the attributes can be individually scored by assigning a value to attributes. In this example, scoring can be composed around a rule that the higher the value, the more likely the user will like to view the streaming video. As such, the streaming video with the highest score may be used. In certain embodiments, some attributes can be associated with negative numbers. For example, if the user repeatedly provides feedback that the user does not like streaming video associated with a particular attribute (e.g., an uploader, a website, a type of streaming video such as music video, television show, etc., linguistic content associating the video with poor lighting, etc.), then negative partial scores can be associated with the attribute. Additionally or alternatively, a weighting (e.g., a multiplier on the attribute partial scores) can be used. In a similar manner, partial scores associated with favorable reviews can be raised and/or weighted more. Additionally, in certain scenarios, some weighting and/or alterations to scoring of the attributes can be associated with the particular playlist, while others can be associated with the user. This can be useful, for example, if the user likes watching particular types of streaming videos when listening to one playlist and other types of streaming videos when listening to another playlist.

The analysis module 216 then determines one of the streaming videos to play with the selected audio based on the respective scores of the streaming videos. The streaming video with the most favorable score can selected for playback. Partial scores associated with each of the attributes can be added together to generate a total score for each of the streaming videos. Further, attributes may be filtered during the scoring process.

In certain examples, the computing system 200 can use input/output interfaces 234 to transmit the streaming video and/or transmit a link to the streaming video. In certain scenarios, a media player on the user's device can receive the link and play the video along with the audio. In one scenario, the link can be sent along with an instruction to cause playback of the video with the audio. In this manner, the user need not see the link, but is able to view the streaming video content.

Once playback of the selected audio and the associated streaming video occurs on the user's device, the user can be allowed to provide additional feedback on the streaming video, the audio, combinations thereof, etc. When feedback is provided, the feedback can be transmitted from the user's device to the computing system 200. When feedback is received by the feedback module 218, scoring of attributes can be reevaluated and changed if necessary. In certain examples, when a negative feedback is received about the streaming video, the streaming video can be stopped and the next video associated with the audio can be played. Further, in certain scenarios, feedback can be based on questions posed to the user about what the user like and/or dislikes. This feedback can be used as a training set to score attributes.

As such, feedback received by the feedback module 218 can be used to customize future streaming video for the user and/or the user's playlist. The audio selector 210 can select a second audio track (e.g., via the playlist or a radio station). The web crawler 212 can search the Internet for a second set of streaming videos associated with the second audio track. The search may have occurred previously and a database may be used to determine the associated streaming videos. The each of the streaming videos of the second set of streaming videos is also respectively associated with one or more attributes. As such, the scoring module 214 can associate a score with each of the attributes based on the user's history as well as the user's recent feedback. Scores can be determined for each of the streaming videos of the second set. The scores can be based on partial scores for each of the attributes. The analysis module 216 can further determine one of the streaming videos of the second set to play with the selected second audio track based on the associated scores. The computing system 200 can then facilitate access to the determined streaming video for the user's device.

A processor 230, such as a central processing unit (CPU) or a microprocessor suitable for retrieval and execution of instructions and/or electronic circuits can be configured to perform the functionality of any of the modules 210, 212, 214, 216, 218 described herein. In certain scenarios, instructions and/or other information, such as streaming video information, attribute information, etc. can be included in memory 232 or other memory. Input/output interfaces 234 may additionally be provided by the computing system 200b. For example, input devices 240, such as a keyboard, a touch interface, a mouse, a microphone, etc. can be utilized to receive input from an environment surrounding the computing system 200b. Further, an output device 242, such as a display or speaker, can be utilized to present information to users. Examples of output devices include speakers, display devices, amplifiers, etc. Moreover, in certain embodiments, some components can be utilized to implement functionality of other components described herein.

Each of the modules 210-218 may include, for example, hardware devices including electronic circuitry for implementing the functionality described herein. In addition or as an alternative, each module 210-218 may be implemented as a series of instructions encoded on a machine-readable storage medium of computing system 200 and executable by processor 230. It should be noted that, in some embodiments, some modules are implemented as hardware devices, while other modules are implemented as executable instructions.

Figure 3:
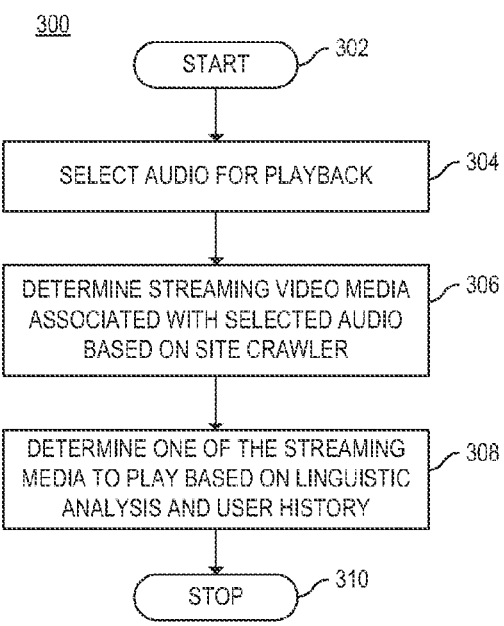
FIG. 3 is a flowchart of a method for determining video media to play with selected audio, according to one example.

FIG. 3 is a flowchart of a method for determining video media to play with selected audio, according to one example. Although execution of method 300 is described below with reference to computing system 200, other suitable components for execution of method 300 can be utilized (e.g., music platform 102, computing device 500, etc.). Additionally, the components for executing the method 300 may be spread among multiple devices. For example, one or more servers may be used to implement the functionality of method 300. Method 300 may be implemented in the form of executable instructions stored on a machine-readable storage medium and/or in the form of electronic circuitry.

Method 300 may start at 302, where a user uses a device to playback audio. The audio can be associated with a playlist on the device and/or a playlist on the computing system 200. If the audio is based on a playlist on the device, the playlist and/or a subset of the playlist can be transmitted to the computing system. The method can then proceed to 304, where an audio selector 210 of computing system 200 may select audio for playback to a user. The selection can occur in preparation for the playback to the user. If the device controls the playlist, the selection can be based on information received from the device. If the computing system 200 controls the playlist, the audio is determined based on playlist information stored at the computing system 200.

Then, at 306, the computing system 200 determines multiple streaming video media that is associated with the selected audio based on a site crawler. In certain embodiments, a site crawler searches the Internet in a methodical way for the streaming video media. The site crawler can determine link information to allow a user device with Internet access to retrieve the streaming video content. Further, the site crawler can determine linguistic content in web pages associated with the streaming video content. The linguistic content can be used to determine attributes. Moreover, attributes can be determined from other information accessible to the site crawler, such as tags, author information, etc. Linguistic content can include words that are associated with web pages associated with the streaming video media. As such, linguistic content can include a tag, a comment, author information, a number of views of the streaming video media, viewer demographics, an artist, an album, a genre, feedback and reviews of other users, combinations thereof, etc.

The determination of the streaming video media can be based on comparisons of attributes and description information of the audio with the linguistic content, the attributes associated with the streaming video media, or the like. In some embodiments, the determination of the streaming video media can also be based, at least in part, on a comparison of audible content associated with the selected audio and audible content included in the streaming video media. For example, an analysis of words in the audible content of the audio and the streaming video media can be compared, an audio fingerprint of the two can be compared, or other technologies can be used to determine how close audio is between the streaming video media and one or more audio tracks. As such, the determination can be based on a determination that the streaming video media includes audible content (e.g., words, a rhythm, etc.) associated with or within the selected audio.

The determination of the streaming video media associated with the audio can occur before the audio is selected. For example, a database can be kept and updated that determines the list of associated streaming video media. As noted, the updating can be based on the site crawler.

Then, at 308, an analysis module 216 can determine one of the streaming video media to play with the selected audio based on a linguistic analysis of the linguistic content and a user history. In this scenario, the linguistic content can be processed to determine attributes. As detailed above, the attributes can be scored. The scoring can further be based on a user history. In certain embodiments, a user history includes feedback of the user of the device or an account associated with the user of the device. As such, the determination of the one streaming video medium can be customized for the user.

The determined access to the streaming video media can then be provided to the user's device, for example, during playback of the audio. In certain scenarios, the providing can occur by sending a link associated with the streaming video medium to the user's device. The link can be packaged using an API to automatically play when the user's device plays the selected audio. Further, the link can be sent before the selected audio is played back so it can be cached. In one scenario, the computing system 200 can provide an instruction to mute the video and allow the selected audio to be audible in a media player of the device. In another scenario, the computing system can receive the video stream and combine the video stream and the audio stream of the selected audio to provide to the user's device. In other scenarios, the media player can control the audible streams. The method 300 stops at 310. The computing system 200 can continue to perform other processes, such as monitoring playlists, crawling the web for updates to video content, etc.

Figure 4:
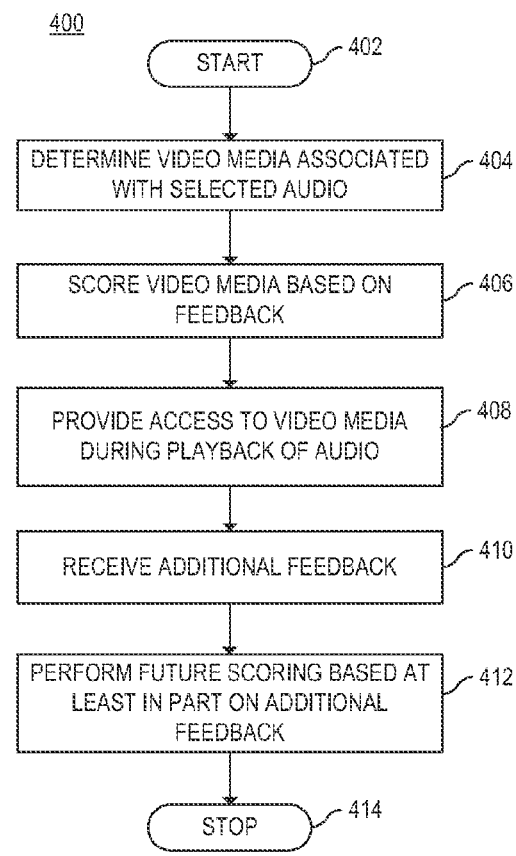
FIG. 4 is a flowchart of a method for using feedback to determine video media to play with audio, according to one example.

FIG. 4 is a flowchart of a method for using feedback to determine video media to play with audio, according to one example. Although execution of method 400 is described below with reference to computing system 200, other suitable components for execution of method 400 can be utilized (e.g., music platform 102, computing device 500, etc.). Additionally, the components for executing the method 400 may be spread among multiple devices. For example, one or more servers may be used to implement the functionality of method 400. Method 400 may be implemented in the form of executable instructions stored on a machine-readable storage medium and/or in the form of electronic circuitry.

Method 400 may start at 402, where the computing system 200 is in a state where a user has initiated use of a program on the user's device to listen to audio of a playlist while receiving video media. The computing system 200 determines audio for playback to the user. Then, at 404, the computing system 200 determines video media associated with selected audio, for example, as implemented in 306.

At 406, a scoring module 214 scores each of the video media (e.g., streaming video media) based on a linguistic analysis and feedback as detailed above. The feedback can be associated with the user and can be part of a user history. In certain scenarios, at least some of the feedback can be specific to the playlist. In other scenarios, at least some of the feedback can be specific to a user. The analysis module 216 can then determine or select one of the video media based on the scoring as described above.

At 408, the computing system 200 can provide access to the video media during playback of the selected audio. In one example, providing access to streaming video media can be implemented by sending a link to the user's device. The link can be sent as part of an API to automatically start the video when the selected audio is played. In another example, the user can open access to the computing system 200 using a web browser. The web page shown to the user can have embedded the selected audio and the video media for simultaneous playback. In certain examples, simultaneous playback can include playback of both the selected audio and at least part of the video media at the same time. In yet another example, the user can receive the actual video files from the computing system 200 or a link to another platform where the user's device can download the files. As such, the user's device can play the determined audio and the video together.

Options can be provided to the user for feedback about the audio, the video, or a combination thereof. The user can input the feedback (e.g., a good response, a bad response, a numerical or selectable rating, etc.). The feedback is then sent to the computing system 200. At 410, the computing system 200 receives the additional feedback about the video media.

Then, at 412, the scoring module 214 can perform future scoring based at least in part of the additional feedback. Further, the additional feedback can be used to train the linguistic analysis to score the linguistic content respectively associated with the video media. This can occur by determining the attributes associated with the video media and either altering or weighting the attributes' values based on the feedback. At 414, the method 400 stops. Other processes of the computing system 200 can continue. For example, the computing system 200 can continue to crawl the web for additional video media, continue to monitor playlists, etc.

Figure 5:
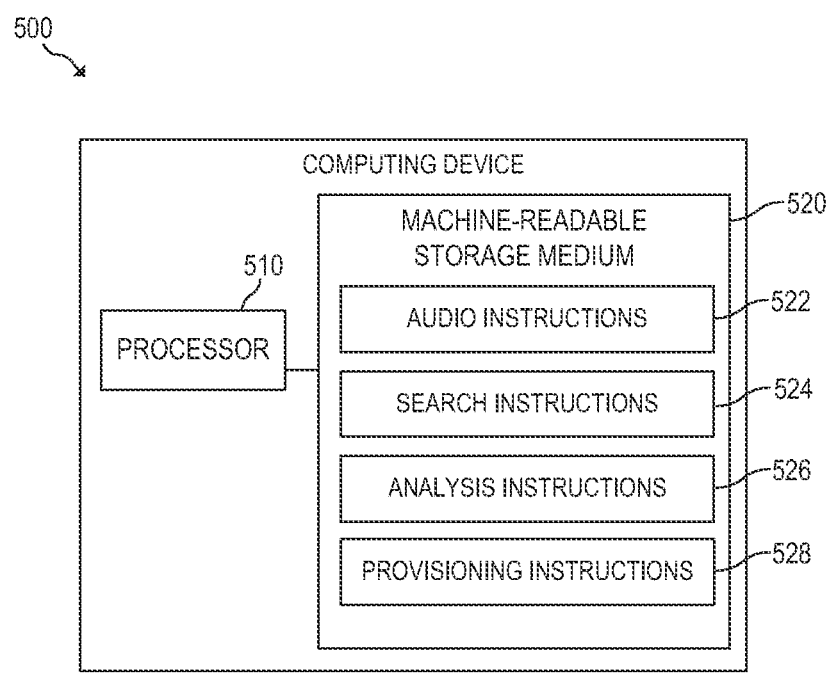
FIG. 5 is a block diagram of a computing device capable of providing access to a video file based on audio playback, according to one example.

FIG. 5 is a block diagram of a computing device capable of providing access to a video file based on audio playback, according to one example. The computing device 500 includes, for example, a processor 510, and a machine-readable storage medium 520 including instructions 522, 524, 526, 528 for providing customized access to a video file based on audio playback. Computing device 500 may be, for example, a server, a workstation, a group of computers, a cloud computing device, or any other computing device.

Processor 510 may be, at least one central processing unit (CPU), at least one semiconductor-based microprocessor, at least one graphics processing unit (CPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526, 528 to implement methods 300, 400. As an alternative or in addition to retrieving and executing instructions, processor 510 may include at least one integrated circuit (IC), other control logic, other electronic circuits, or combinations thereof that include a number of electronic components for performing the functionality of instructions 522-528.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for providing access to a video file for simultaneous playback with audio.

Audio instructions 522 can be executed by the processor 510 to determine audio to playback to a user based on a playlist of a user account. The user account can be used to associate a user, a user history, user feedback, user playlists, user radio stations, etc. with the user. The user can use a personal device to access content services from the computing device 500. The audio can be determined from a queue of the playlist. For example, the audio can be the next audio track queued on the playlist.

The processor 510 can execute search instruction 524 to search the Internet for video files associated with the audio. In some examples, the video files can be streaming video files. In other examples the video files can be downloadable or other types of video files. In certain scenarios, the search can be implemented via a web crawler and a database can be generated associating the video files and associated attributes/linguistic content with the audio track and/or other audio tracks. When the audio track is determined, a set of the video files can be determined that the user may wish to view in conjunction with the audio track. As detailed above, the video files can each be associated with one or more attributes. Further, the attributes can include one or more words included on respective web pages from which the respective video files are found.

Analysis instructions 526 can be used to score the video files of the set based on their respective attributes. As detailed above, the scoring can be based, at least in part, on historical feedback associated with the user account. The feedback can be used to score respective attributes associated with each of the video files. In certain scenarios, the scores of the attributes can be added together or otherwise processed (e.g., averaging, weighting, normalizing, etc.) to generate a score for each of the respective video files. The computing device 500 can then determine one of the video files to play with the audio track during playback of the audio track based on the scores. The best score amongst the video files can be selected.

Provisioning instructions 528 can be executed by the processor 510 to provide access to the video file. In one example, the access can be provided by sending the user's device the video file. In another example, the access can be facilitated by providing a link to the video file or a location to stream the video content associated with the video file. The link can be provided via an embedded web page or via an API interacting with an application of the user's device to trigger viewing of the video file in conjunction with the determined audio track.

Figure 6:
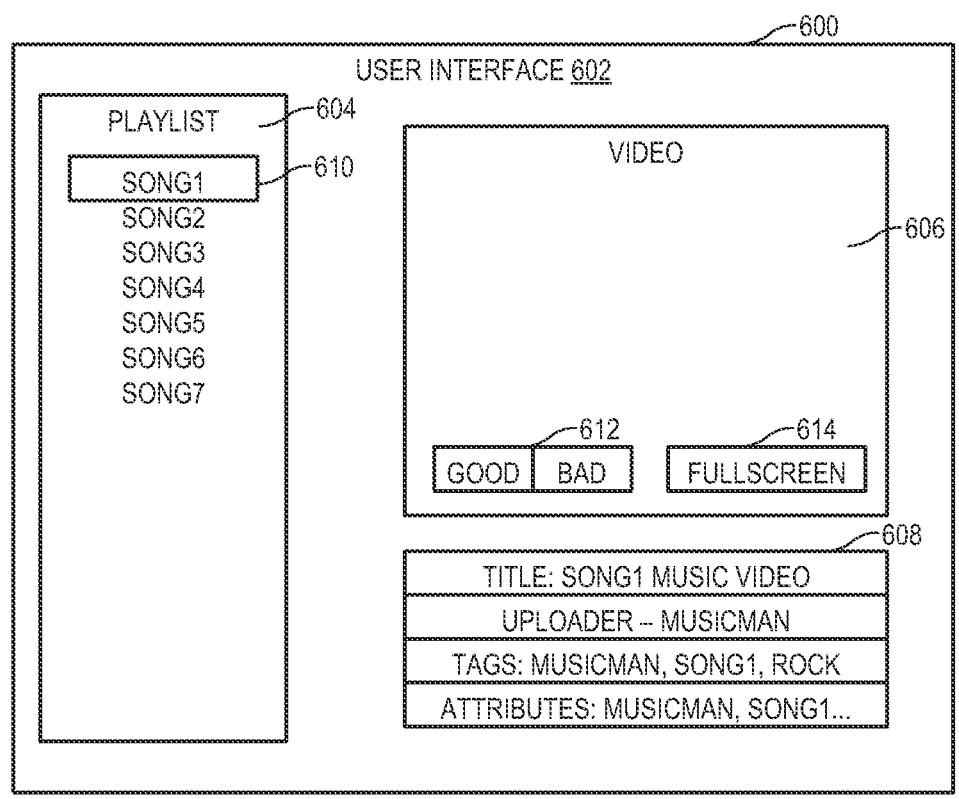
FIG. 6 is a block diagram of an example user interface of a user device playing audio while simultaneously showing associated video, according to one example.

FIG. 6 is a block diagram of an example user interface of a user device playing audio while simultaneously showing associated video, according to one example. The user device can be a computing device, for example, a tablet device, a slate device, a mobile phone, a laptop device, a desktop computer, etc. The user device 600 can include a display to present a user interface 602 to a user. The user interface 602 can be used to present a playlist 604 for audio, and a video area 606. The user interface 602 may also include additional description information 608 describing the video and/or playing audio, such as song1 610.

As noted above, when the user device 600 is playing a playlist 604, the audio tracks, such as songs, podcasts, etc., on the playlist 604 can be known by a computing system, such as an audio platform or music platform. The audio tracks can be streamed and/or downloaded before being played. Video files associated with one or more of the audio tracks can be determined by the platform. The platform can then facilitate access to a video file or multiple video files that the platform determines is associated with the audio track as described above. In certain scenarios, the access can be in the form of a file location for the user device 600 to download and/or stream from. Further, the user device 600 can include a programming interface to communicate with the platform to allow for video to be displayed automatically based on the received location information of the video file.

In this example, song1 610 can be selected and access to a video can be provided in the video area 606. The video area 606 may also provide the user with feedback options 612. Other options, such as a full screen video option 614, can also be available to the user. In one scenario, if a feedback option 612 selected is good, description information 608 and/or other attributes associated with the video can be processed as being good attributes. Further, if the feedback option 612 selected is bad, the description information 608 and/or other attributes associated with the video can be processed as being bad or unwanted attributes. A running tally of wanted and/or unwanted attributes can be used in scoring. Additionally, certain attributes, such as uploader, title, website associated with the video file, etc. can be weighted more. Future selection of the video to display on the video area 606 can be based on the received feedback.

What is claimed is:

1. A method of a computer, comprising:
   selecting audio for playback;
   determining a plurality of streaming video media associated with the selected audio based on use of a site crawler, wherein each of the plurality of streaming video media is associated with linguistic content;
   determining a given streaming video media of the plurality of streaming video media to play with the selected audio based on a linguistic analysis of the linguistic content and a user history including feedback by a user;
scoring each of the plurality of streaming video media based on the linguistic analysis and the feedback, wherein the determining of the given streaming video media is based on the scoring;
receiving additional feedback about the given streaming video media,
wherein the additional feedback is used to train the linguistic analysis to score the linguistic content respectively associated with the given streaming video media.

2. The method of claim 1, wherein the given streaming video media includes embedded audio that is muted while the selected audio is played.

3. The method of claim 1, wherein the linguistic content includes at least one of: a tag, a comment, author information, a number of views, viewer demographics, an artist, an album, a genre, and feedback.

4. The method of claim 1, further comprising:
providing access to the given streaming video media during playback of the selected audio.

5. A method of a computer, comprising:
selecting audio for playback;
determining a plurality of streaming video media associated with the selected audio based on use of a site crawler, wherein each of the plurality of streaming video media is associated with linguistic content; and
determining a given streaming video media of the plurality of streaming video media to play with the selected audio based on a linguistic analysis of the linguistic content and a user history, wherein the determining of the given streaming video media is based, at least in part, on comparing audible content of the given streaming video media with the selected audio.

6. The method of claim 5, wherein the user history includes feedback by the user.

7. A computing system comprising:
at least one processor;
an audio selector to select audio associated with a user;
a web crawler to determine a plurality of streaming videos associated with the selected audio, wherein the streaming videos are respectively associated with one or more attributes;
a scoring module to perform a statistical analysis on the one or more attributes to score each of the streaming videos based, at least in part, on feedback of the user;
an analysis module to determine a given streaming video of the streaming videos to play with the selected audio based on the respective scores;
a feedback module to receive additional feedback about the given streaming video from the user,
wherein the audio selector is to select a second audio associated with the user,
wherein the web crawler is to search for a plurality of second streaming videos associated with the selected second audio, wherein the second streaming videos are respectively associated with one or more second attributes,
wherein the scoring module is to score each of the second streaming videos based on the feedback and the additional feedback, and
wherein the analysis module is to determine one of the second streaming videos to play with the selected second audio based on the respective scores of the second streaming videos,
wherein the audio selector, the web crawler, the scoring module, the analysis module, and the feedback module are executable on the at least one processor.

8. The computing system of claim 7, wherein the one or more attributes include at least one of: a tag, a comment, author information, a number of views, and viewer demographics.

9. A non-transitory machine-readable storage medium storing instructions that, if executed by at least one processor of a device, cause the at least one processor to:
select audio to playback based on a playlist of a user account;
search for a plurality of video files associated with the selected audio, wherein the video files are respectively associated with one or more attributes;
score the video files based on analysis of the respective one or more attributes by an analysis module, wherein the scoring is based, at least in part, on user feedback associated with the user account;
determine a given video file of the video files to play with the selected audio during playback of the selected audio based on the scoring;
provide access to the given video file;
receive additional feedback about the given video file; and
train the analysis module using the additional feedback.

10. The non-transitory machine-readable storage medium of claim 9, wherein the video files include streaming video files.

11. The non-transitory machine-readable storage medium of claim 9, wherein the one or more attributes include a plurality of words included on respective web pages associated with the respective video files.

* * * * *